(12) United States Patent
Eleftheriou et al.

(10) Patent No.: US 9,724,746 B2
(45) Date of Patent: Aug. 8, 2017

(54) AERODYNAMICALLY ACTIVE STIFFENING FEATURE FOR GAS TURBINE RECUPERATOR

(71) Applicant: PRATT & WHITNEY CANADA CORP., Longueuil (CA)

(72) Inventors: Andreas Eleftheriou, Woodbridge (CA); Daniel Alecu, Toronto (CA); David Menheere, Georgetown (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 828 days.

(21) Appl. No.: 13/804,118

(22) Filed: Mar. 14, 2013

(65) Prior Publication Data

US 2014/0260178 A1    Sep. 18, 2014

(51) Int. Cl.
| | | |
|---|---|---|
| B21D 53/04 | (2006.01) |
| F02K 1/82 | (2006.01) |
| F02C 7/08 | (2006.01) |
| F28F 3/04 | (2006.01) |
| F28F 13/06 | (2006.01) |
| B21D 49/00 | (2006.01) |

(Continued)

(52) U.S. Cl.
CPC ............. *B21D 53/04* (2013.01); *B21D 49/00* (2013.01); *F02C 7/08* (2013.01); *F02K 1/822* (2013.01); *F28D 7/1684* (2013.01); *F28D 9/0031* (2013.01); *F28F 3/046* (2013.01); *F28F 13/02* (2013.01); *F28F 13/06* (2013.01); *F05D 2210/34* (2013.01); *F05D 2250/711* (2013.01); *F05D 2250/712* (2013.01); *F28D 2021/0026* (2013.01); *Y02T 50/672* (2013.01); *Y02T 50/675* (2013.01); *Y10T 29/49357* (2015.01)

(58) Field of Classification Search
CPC ... F02C 7/08; F02C 7/10; B21D 53/02; F02K 3/115; F28F 3/02; F28F 3/025; F28F 3/04; F28F 3/046; F28F 3/048; F28F 13/02; F28F 13/06; F28F 13/12; F28D 9/0012; F28D 9/0037; F28D 9/0056
See application file for complete search history.

(56) References Cited

U.S. PATENT DOCUMENTS 1,557,467 A  * 10/1925  Modine ........................ 165/151
1,959,637 A  *  5/1934  Opitz ............................ 165/76

(Continued)

*Primary Examiner* — Pascal M Bui Pho
*Assistant Examiner* — Eric Linderman
(74) *Attorney, Agent, or Firm* — Norton Rose Fulbright Canada LLP

(57) ABSTRACT

A recuperator disposed in the exhaust duct of a gas turbine engine includes a plurality of recuperator plates arranged in a spaced-apart relationship to define therebetween a plurality of interstices and fluid channels, the plurality of interstices adapted to direct therethrough at least one first stream received at a leading plate edge of the recuperator plates and the plurality of fluid channels adapted to direct therethrough at least one second stream to effect heat exchange between the at least one first stream and the at least one second stream. Each recuperator plate includes, formed at the leading plate edge thereof, a first concavity extending along the leading edge in a direction substantially parallel to a longitudinal axis of the plate. The first concavity extends transversely to a direction of the at least one first stream flowing over each recuperator plate.

16 Claims, 8 Drawing Sheets

(51) Int. Cl.
  *F28F 13/02* (2006.01)
  *F28D 7/16* (2006.01)
  *F28D 9/00* (2006.01)
  *F28D 21/00* (2006.01)

(56) References Cited

U.S. PATENT DOCUMENTS

| | | | |
|---|---|---|---|
| 2,965,359 A | 12/1960 | Hryniszak | |
| 3,228,464 A * | 1/1966 | Stein et al. | 165/166 |
| 3,267,673 A * | 8/1966 | Hemsworth et al. | 60/39.511 |
| 3,320,749 A * | 5/1967 | Castle et al. | 60/226.1 |
| 3,451,474 A * | 6/1969 | Cox | 165/166 |
| 3,545,062 A * | 12/1970 | Cox | 29/890.039 |
| 3,759,322 A | 9/1973 | Nasser et al. | |
| 3,818,984 A * | 6/1974 | Nakamura et al. | 165/166 |
| 3,931,854 A * | 1/1976 | Ivakhnenko et al. | 165/166 |
| 4,216,825 A * | 8/1980 | Sumitomo | 165/109.1 |
| 4,438,809 A | 3/1984 | Papis | |
| 4,470,454 A * | 9/1984 | Laughlin et al. | 165/166 |
| 4,919,200 A * | 4/1990 | Glomski et al. | 165/166 |
| 5,157,893 A * | 10/1992 | Benson et al. | 52/789.1 |
| 5,806,584 A * | 9/1998 | Thonon et al. | 165/166 |
| 6,221,463 B1 * | 4/2001 | White | 428/174 |
| 6,273,183 B1 * | 8/2001 | So | F28F 13/12 165/109.1 |
| 6,305,079 B1 * | 10/2001 | Child et al. | 29/890.039 |
| 6,334,985 B1 * | 1/2002 | Raghuram et al. | 422/224 |
| 6,460,614 B1 * | 10/2002 | Hamert et al. | 165/170 |
| 6,904,747 B2 * | 6/2005 | Nirmalan et al. | 60/39.511 |
| 6,951,110 B2 * | 10/2005 | Kang | 60/772 |
| 7,065,873 B2 | 6/2006 | Kang et al. | |
| 7,988,447 B2 | 8/2011 | Fowser et al. | |
| 2002/0079085 A1 * | 6/2002 | Rentz | 165/54 |
| 2005/0039898 A1 * | 2/2005 | Wand et al. | 165/167 |
| 2009/0194268 A1 * | 8/2009 | Kristensen et al. | 165/185 |
| 2010/0089560 A1 * | 4/2010 | Shikazono | F28D 1/05366 165/177 |
| 2012/0111548 A1 * | 5/2012 | Toparkus | B21D 15/12 165/177 |
| 2012/0216506 A1 * | 8/2012 | Eleftheriou et al. | 60/39.511 |
| 2012/0216543 A1 * | 8/2012 | Eleftheriou et al. | 60/772 |
| 2012/0216544 A1 * | 8/2012 | Eleftheriou et al. | 60/772 |
| 2013/0199152 A1 * | 8/2013 | Menheere et al. | 60/39.511 |
| 2013/0255268 A1 * | 10/2013 | Eleftheriou et al. | 60/772 |
| 2015/0099453 A1 * | 4/2015 | Eleftheriou et al. | 454/284 |

* cited by examiner

AERODYNAMICALLY ACTIVE STIFFENING FEATURE FOR GAS TURBINE RECUPERATOR

TECHNICAL FIELD

The present disclosure relates generally to gas turbine engines and more particularly to recuperators for such gas turbine engines.

BACKGROUND

A recuperator may be used to effect heat exchange in a gas turbine engine. A high performance recuperator typically needs a large number of recuperator plates made from thin foil, positioned relative to one another with high accuracy. In particular, a pair of sheets are generally joined together to form each recuperator plate and precise positioning of the two sheets is desired when assembling them into the plate. However, due to the small features of each sheet, such positioning precision may be difficult to achieve.

Conventional assemblies tend to rely on trimming the edges of the sheets to position the latter. This may result in the plates becoming wavy during the press forming of each recuperator plate, thereby reducing the accuracy in the relative positioning of the sheets. As a result, the overall performance of the recuperator is negatively effected.

There is therefore a need for improved gas turbine engine recuperators.

SUMMARY

In one aspect, there is provided a recuperator for a gas turbine engine, the recuperator comprising: a plurality of recuperator plates arranged in a spaced-apart relationship to define therebetween a plurality of interstices and fluid channels, the plurality of interstices adapted to direct therethrough at least one first stream received at a leading plate edge of the recuperator plates and the plurality of fluid channels adapted to direct therethrough at least one second stream to effect heat exchange between the at least one first stream and the at least one second stream, each recuperator plate having formed at the leading plate edge thereof a first concavity extending along the leading edge in a direction substantially parallel to a longitudinal axis of the plate, the first concavity extending transverse to a direction of the at least one first stream flowing over each said recuperator plate.

In another aspect, there is provided a gas turbine engine comprising: a compressor which pressurizes an air flow; a combustor receiving the pressurized air flow and which ignites a mixture of fuel and the pressurized air flow to develop an output flow of expanded combustion gasses through one or more turbine sections for generating propulsion; a turbine receiving the output flow of expanded combustion gasses from the combustor and extracting energy from the combustion gases; and a recuperator disposed downstream of the turbine and receiving the exhaust gasses therefrom, the recuperator comprising a plurality of recuperator plates arranged in a spaced-apart relationship to define therebetween a plurality of interstices and fluid channels, the plurality of interstices adapted to direct therethrough at least one first stream received at a leading plate edge of the recuperator plates and the plurality of fluid channels adapted to direct therethrough at least one second stream to effect heat exchange between the at least one first stream and the at least one second stream, each recuperator plate having at the leading plate edge thereof a first concavity extending along the leading edge in a direction substantially parallel to a longitudinal axis of the recuperator plate, the first concavity extending transverse to a direction of the at least one first stream flowing over each said recuperator plate.

In a further aspect, there is provided a method for manufacturing a recuperator for a gas turbine engine, the method comprising: forming a first leading recess adjacent a first leading edge of a first thermally conductive sheet and forming a second leading recess adjacent a second leading edge of a second thermally conductive sheet, the first and second thermally conductive sheets being components of a recuperator plate; mating the first leading recess of the first thermally conductive sheet with the second leading recess of the second thermally conductive sheet; following the step of mating, joining the first and second leading sheet edges and a first and second trailing sheet edges thereby forming a recuperator plate, the first and second leading recesses forming a trough extending along a leading edge of the recuperator plate in a direction substantially parallel to a longitudinal axis of the recuperator plate.

BRIEF DESCRIPTION OF THE DRAWINGS

Reference is now made to the accompanying figures in which.

DETAILED DESCRIPTION

Figure 1:
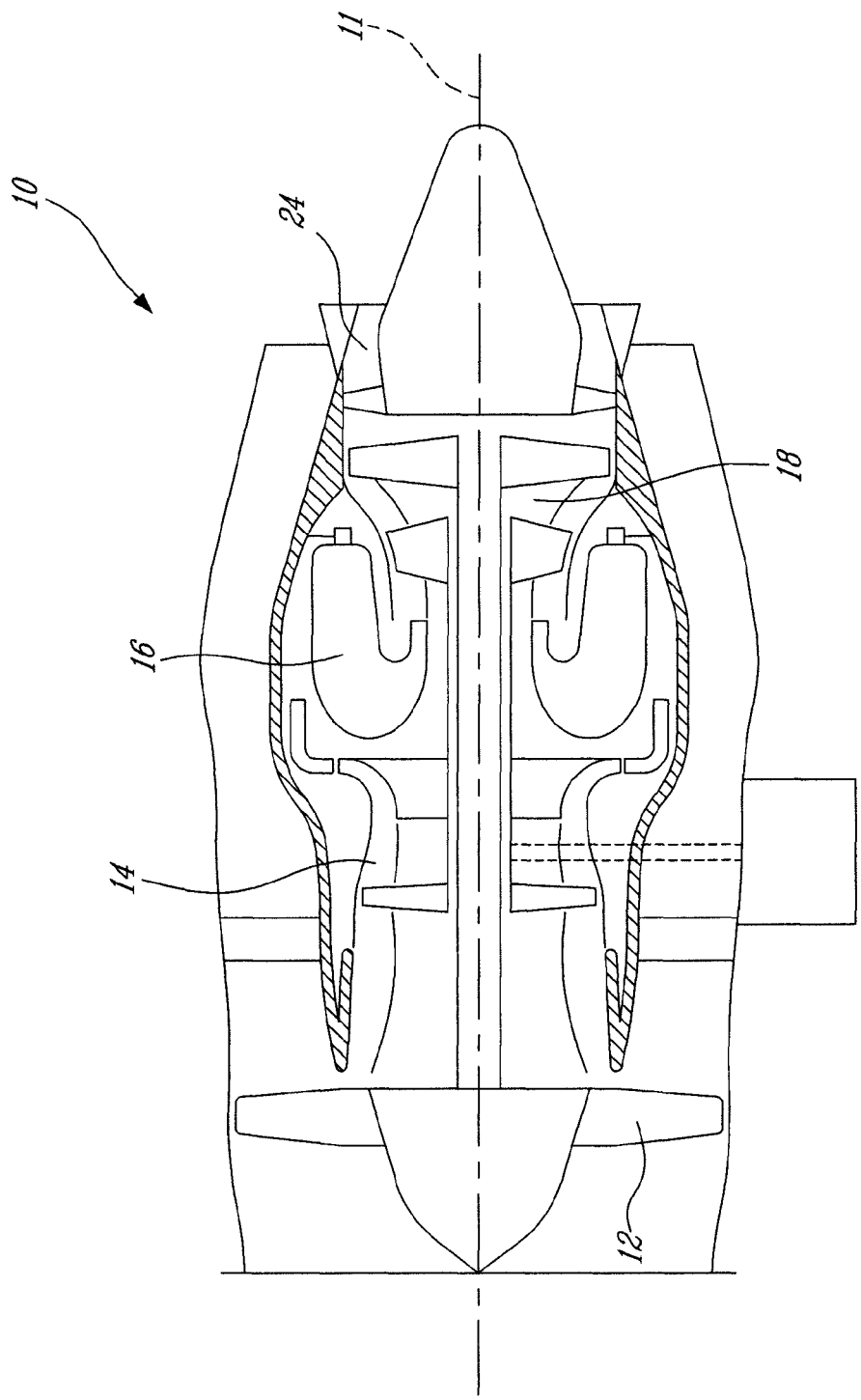
FIG. 1 is a schematic cross-sectional view of a gas turbine engine.

FIG. 1 illustrates a gas turbine engine 10 of a type preferably provided for use in subsonic flight, generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The combustion gases flowing out of the combustor 16 circulate through the turbine section 18 and are expelled through an exhaust duct 24.

Although illustrated as a turbofan engine, the gas turbine engine 10 may alternatively be another type of engine, for example a turboprop or turboshaft engine, also generally comprising in serial flow communication a compressor section, a combustor, and a turbine section, and further including an exhaust duct through which the hot turbine gases are expelled.

Figure 2:
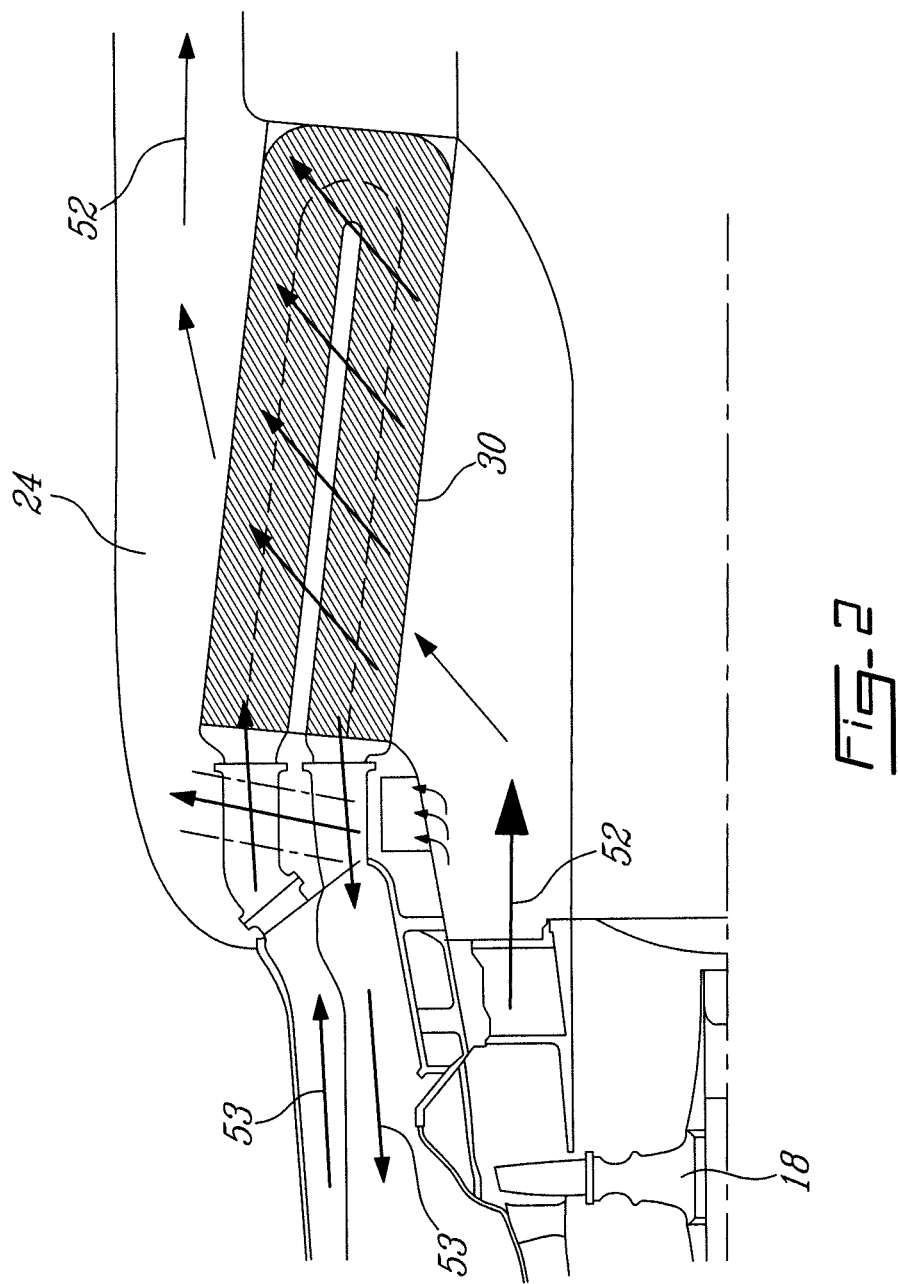
FIG. 2 is a partial cross-sectional view of the gas turbine engine of FIG. 1, showing a recuperator in accordance with an embodiment.

Referring to FIG. 2, a recuperator 30 extends across the exhaust duct 24, such that the exhaust gas from the turbine section 18 circulates therethrough. As will be discussed further below, the recuperator 30 may then use the hot exhaust gas from the engine 10 to heat compressed air exiting from the compressor 14 and/or fan 12 prior to circulation of the compressed air to the combustion chamber 16. In this manner, the fuel efficiency of the engine 10 is improved while its infrared signature is minimized.

Figure 3:
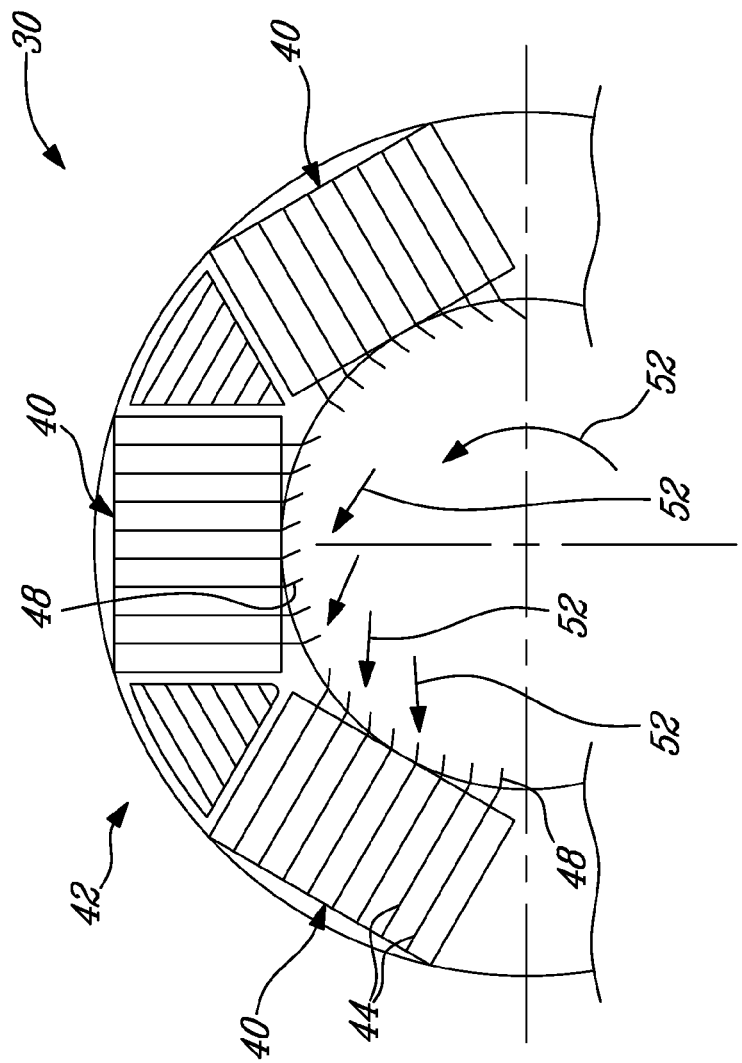
FIG. 3 is a cross-sectional view of the recuperator of FIG. 2.
Figure 4:
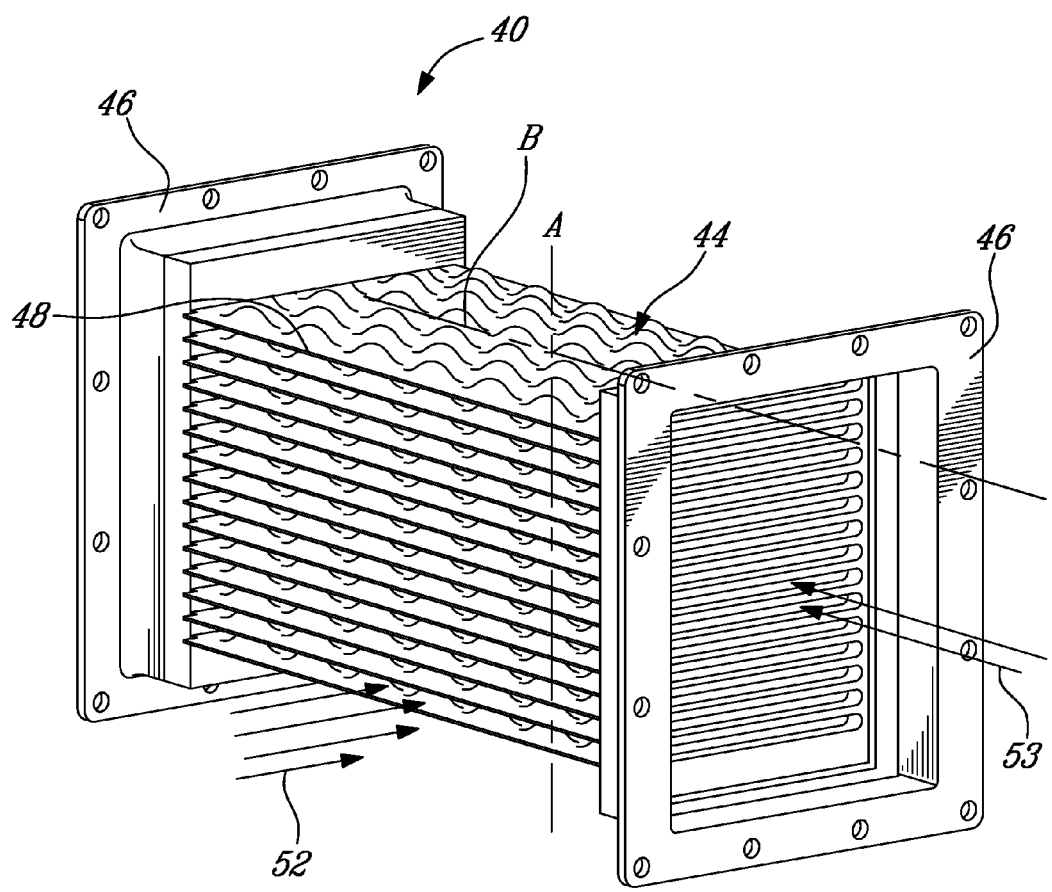
FIG. 4 is a perspective view of a recuperator segment of FIG. 3.

Referring to FIG. 3 and FIG. 4, the recuperator 30 comprises a plurality of recuperator segments 40, which illustratively function and are connected to the engine 10 independently from one another. Structural supports 42 may be provided between adjacent ones of the recuperator segments 40 to provide structural stability. The recuperator segments 40 are positioned relative to one another so as to together define the substantially annular shape of the recuperator 30.

Each recuperator segment 40 comprises a plurality of recuperator plates 44 arranged in a stacked relationship along an axis A. To provide structural stability, the stack may be mounted on one or more backing members 46, such as a frame, chassis or endplate, which does not impede the flow of fluid through the recuperator segment 40.

Figure 5:
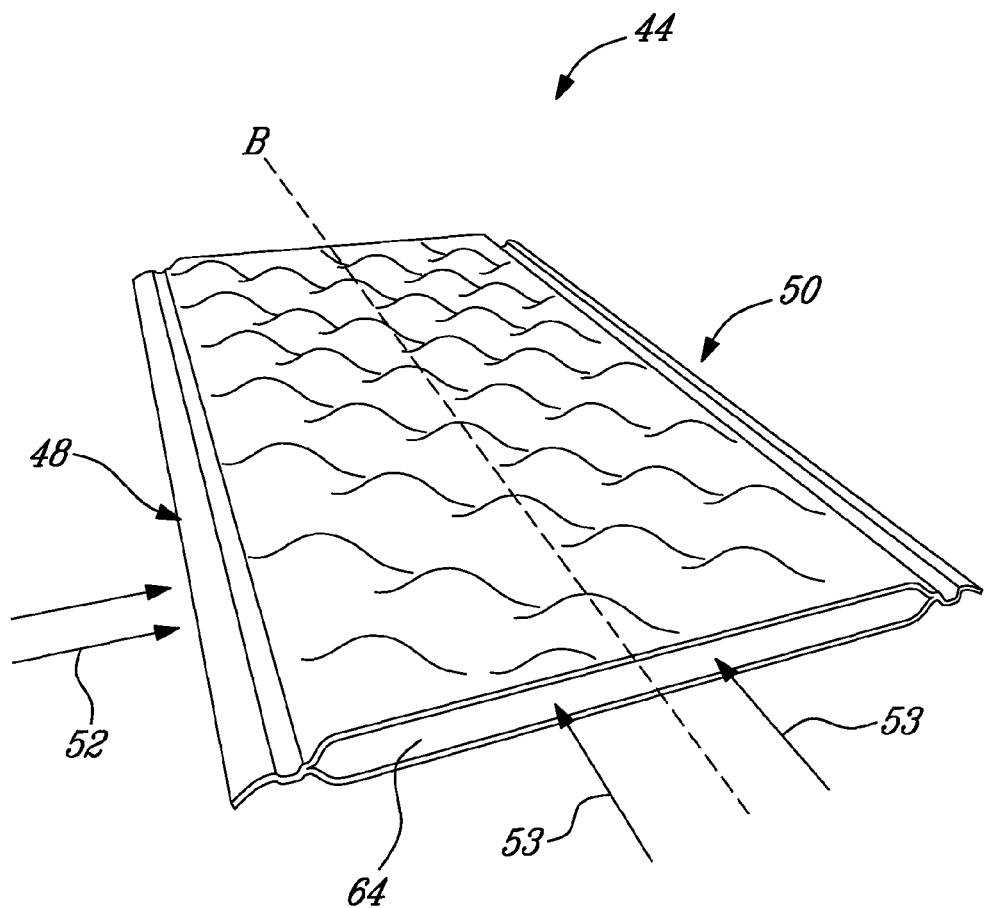
FIG. 5 is a perspective view of a recuperator plate of FIG. 4.

Referring to FIG. 5 in addition to FIG. 2 and FIG. 3, each recuperator plate 44 is elongate and extends along a longitudinal axis B. It should however be understood that each recuperator plate 44 may have some axial curvature by shaping and/or angling thereof to introduce some deviation or curvature to the axis B. Each recuperator plate 44 comprises a leading peripheral edge 48 and a trailing peripheral edge 50 opposite the leading edge 48. With the recuperator 30 extending across the exhaust duct (reference 24 of FIG. 1) of the engine 10, a radial turbine exhaust gas flow 52 is conducted through the recuperator segments 40 and received at the leading edges 48 of the recuperator plates 44. The flow 52 may subsequently progress through the recuperator plates 44 of each recuperator segment 40, as will be discussed further below, and is discharged at the trailing edges 50. A flow 53 of a secondary fluid, such as low-temperature pressurized air output from the compressor 12, may further be drawn, conducted, or otherwise received into the recuperator plates 44. Air flow 53 may be conducted into the recuperator plates 44 in a generally transverse direction to the exhaust gas flow 52. In particular and as will be detailed below, the air flow 53 passes through the recuperator plates 44 in thermal conductive proximity with the exhaust gas flow 52 so as to effect heat exchange therewith. The exhaust gas flow 52 and the air flow 53 are therefore brought closer in temperature than upon entry to the recuperator 30. The hotter of the two fluid flows, e.g. the exhaust gas flow 52, may therefore be cooled while the cooler of the two fluid flows, e.g. the air flow 53, is heated.

Figure 6:
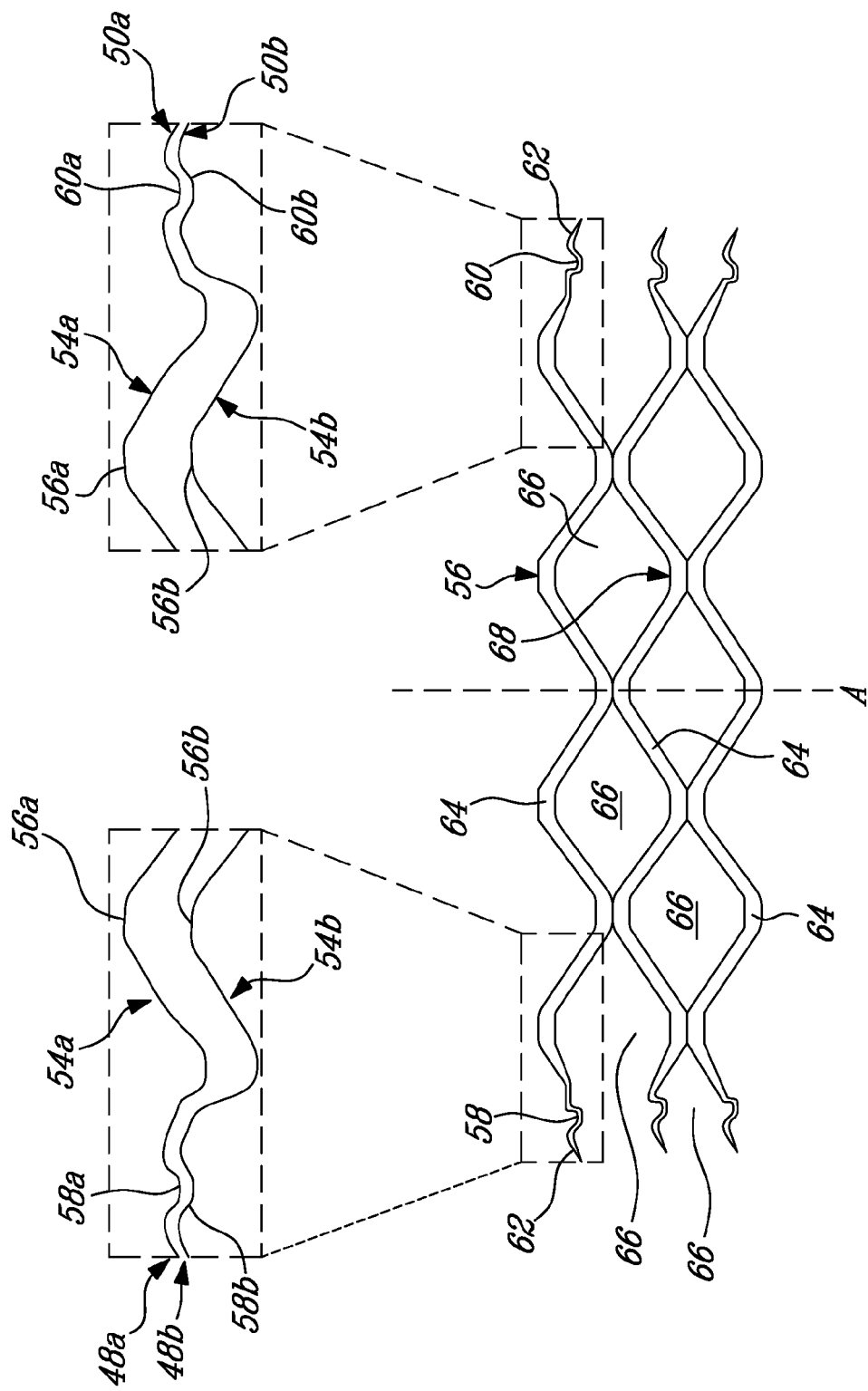
FIG. 6 is a partial cross-sectional view of the recuperator segment of FIG. 4.

Referring to FIG. 6 in addition to FIG. 5, each recuperator plate 44 illustratively comprises a pair of thermally conductive sheets 54a, 54b in sealed together relation. The sheets 54a, 54b, may be made of any suitable thermally conductive and suitable formable material(s), such as metal(s), ceramic matrix composite material(s), and the like, alone or in any combination(s), mixture(s), or concentration(s) suitable for providing heat exchange. The sheets 54a, 54b may be constructed to have a minimal thickness, thus achieving lightweight design and improved thermal efficiency. The sheets 54a, 54b may be joined together by welding, brazing, or any other suitable process.

Figure 7:
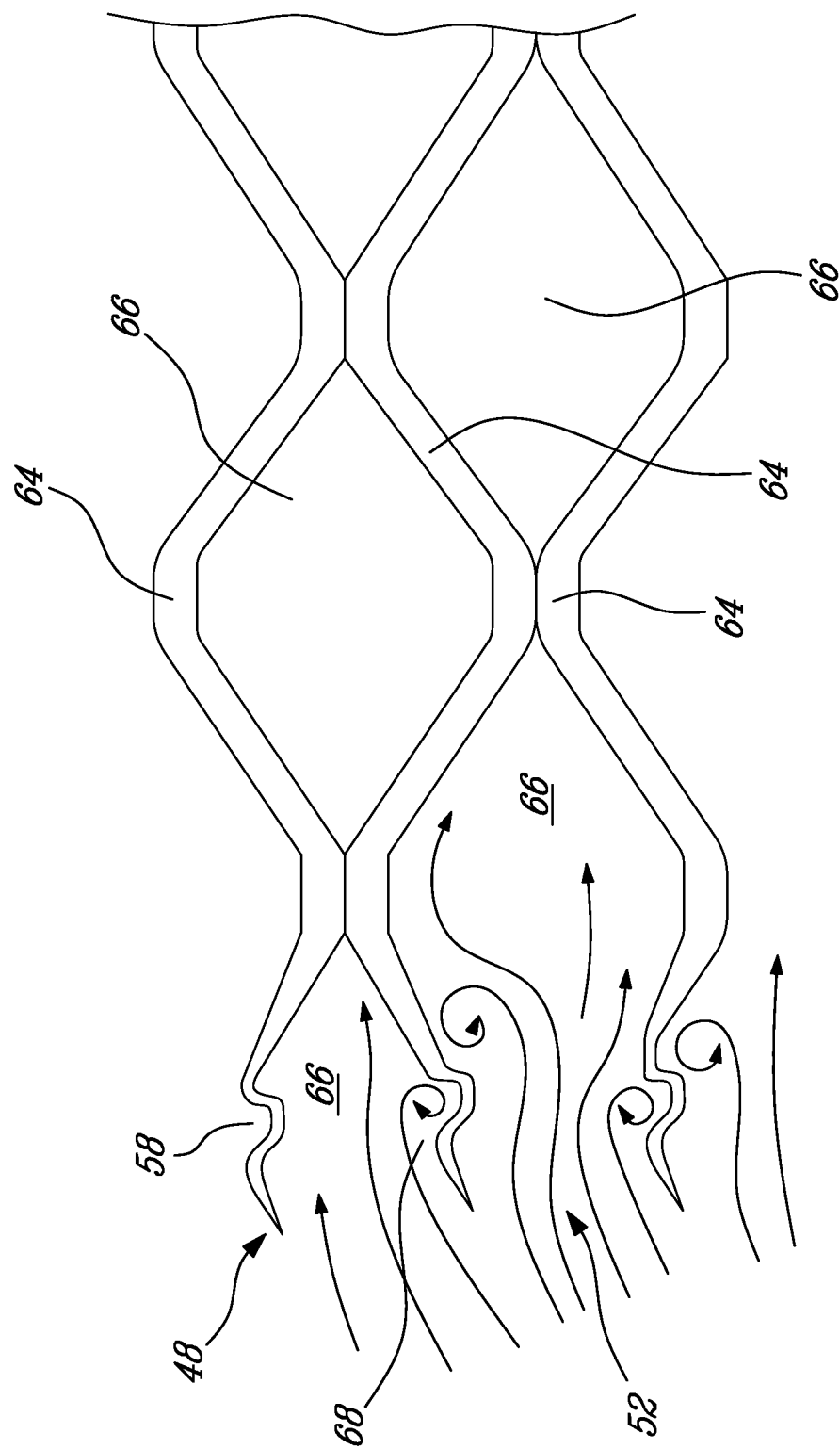
FIG. 7 is a close-up view of FIG. 6 showing a laminar flow in accordance with an embodiment.

A plurality of protrusions or corrugations as in 56a, 56b are illustratively formed on the surface of each sheet 54a, 54b. The protrusions 56a, 56b may be provided in a pattern along at least one dimension (e.g. length, width) of the sheets 54a, 54b so that the latter have a substantially undulated cross-sectional profile. Depending on the positioning and pattern of the protrusions 56a, 56b, the undulations in the cross-sectional profiles of the sheets 54a, 54b may extend widthwise, lengthwise, or any other direction. A first substantially elongate concavity or trough 58a is further formed in the first sheet 54a at the leading edge 48a thereof while a second concavity 60a is formed in the first sheet 54a at the trailing edge 50a thereof. Similarly, a first concavity 58b is formed in the second sheet 54b at the leading edge 48b thereof while a second concavity 60b is formed in the second sheet 54b at the trailing edge 50b thereof. Each concavity 58a, 58b, 60a, 60b extends along the leading and trailing edges in a direction parallel to the longitudinal axis B. In other words, the leading edge concavities 58a, 58b are disposed in a direction substantially transverse to the airflow through the recuperator plates, along the length of each leading edge of each recuperator plate. These leading and trailing edge concavities are disposed and oriented in the sheets 54a, 54b of the plates 44 such that they are generally parallel to one another. Further, the leading edge concavities 58a, 58b are disposed such that the concavities face the suction side of the plates 44 in the recuperator stack (the suction side being defined as a result of the hot turbine exhaust stream entering the recuperator stack at a positive incidence angle). By ensuring that the concavities face the suction side of the recuperator leading edge 48 of plates 44, the leading edge laminar bubble that is created is contained in the trough or concavity 58a, 58b, which energizes the boundary layer and allows the flow to re-attach immediately downstream of the trough, as depicted in FIG. 7. This ensures flow turning with limited pressure loss and increased heat transfer at the leading edge of the recuperator plates 44.

In order to form the protrusions 56a, 56b and the concavity 58a, 58b, 60a, 60b, the sheets 54a, 54b may be press-formed, bent, curled, cut, deformed, tooled, or otherwise machined. In one embodiment, the concavities 58a, 58b, 60a, 60b are formed during manufacturing of a given sheet 54a, 54b prior to forming the protrusions 56a, 56b. As such, the concavities 58a, 58b, 60a, 60b may serve as a centering and reference feature allowing for high accuracy in the relative positioning of the sheets 54a, 54b. Indeed, the concavities 58a, 58b, 60a, 60b provide means for accurately positioning a pair of sheets as in 54a, 54b relative to one another when forming each recuperator plate 44 and during brazing or welding of the plates. As illustrated in FIG. 6, the sheets 54a, 54b may be positioned in close proximity to one another so that corresponding concavities 58a, 58b, 60a, 60b nest or otherwise mate with one another. In particular, a convexly curved surface (not shown) of each concavity 58a, 60a of the first sheet 54a may be conformed to a concavely curved surface (not shown) of each corresponding concavity 58b, 60b of the second sheet 54b. Plate concavities 58 and 60 may then be formed by the mating of a pair of concavities 58a, 58b, 60a, 60b. In this position, the protrusions 56a of the first sheet 54a may further nest or be otherwise conformal fitted with the corresponding protrusions 56b of the second sheet 54b. Plate protrusions 56 may then be formed by the conformal fitting of a pair of protrusions 56a, 56b. The leading edge 48a of the first sheet 54a may then be welded, brazed, or otherwise attached to the leading edge 48b of the second sheet 54b while the trailing edge 50a of the first sheet 54a is welded to the trailing edge 50b of the second sheet 54b, thereby forming brazed areas 62.

The leading edge concavities 58a, 58b and the trailing edge concavities 60a, 60b of the recuperator plates 44 also provide an accurate positioning reference which can be used, once these concavities or longitudinally extending troughs are created in the plates, as a reference guide for subsequently performed manufacturing operations carried out to create the completed recuperator plates 44, such as forming, trimming, and assembly, brazing, etc. The performance of the thus formed recuperator segment (reference 40 in FIG. 3) and accordingly the overall performance of the engine 10 are therefore improved. The provision of the concavities 58a, 58b, 60a, 60b further improves the stiffness of the formed recuperator plate 44 at the leading edge 48 and trailing edge 50 thereof. The geometry of the leading and trailing edges 48, 50 can therefore be maintained while the rest of the plate 44 deforms under thermal and/or pressure loads. As such, buckling of the plate 44 may be prevented.

When the sheets 54a, 54b are coupled as shown in FIG. 6, a fluid channel 64 is defined by the spacing between adjacent surfaces (not shown) of the sheets 54a and 54b. In addition, once each recuperator plate 44 is formed, the plurality of plates 44 are then stacked along the axis A, resulting in the fluid channels 64 being stacked in close proximity to one another. In this configuration, a number of interior compartments or interstitial layers (more generally "interstices") 66 are further formed between adjacent recuperator plates 44. The shape of the interstices 66 may be defined by the shape and spacing between the protrusions as in 56 of adjacent recuperator plates 44. In particular, the protrusions 56 of adjacent plates 44 may oppose so that each protrusion 56 of one plate 44 is sized to accommodate a corresponding recess 68 between adjacent protrusions 56 of an adjacent plate 44. Each interstice 66 may then be defined by the spacing between a concavely curved surface (not shown) of a protrusion 56 of the one plate 44 and a concavely curved surface (not shown) of a recess 68 between adjacent protrusions 56 of the adjacent plate 44.

The fluid channels 64 may be suitable to receive and conduct therethrough the air flow 53 while the interstices 66 may be suitable to receive and conduct therethrough the gas exhaust flow 52. In particular, the fluid channels 64 are illustratively sealed from the external environment, including being sealed from the interstices 66. The exhaust gas flow 52 can therefore be conducted through the recuperator 30 without admixture or interminglement with the air flow 53. As the air flow 53 passes through the fluid channels 64 in thermal conductive proximity with the exhaust gas flow 52 passing through the interstices 66, heat exchange is effected between the air flow 53 and the exhaust gas flow 52. In addition, due to the undulating pattern of the protrusions 56 on each recuperator plate 44, an undulating flow path is formed in the fluid channels 64. Fluid turbulence, and therefore fluid mixing, is thus increased within the fluid channels 64 to promote heat exchange between the air flow 53 and the exhaust gas flow 52. It should be understood that while it may be advantageous in some embodiments for the fluid channels 64 to conduct a relatively high-pressure, low-temperature fluid, e.g. the air flow 53, in comparison to a relatively low-pressure, high-temperature fluid, e.g. the exhaust gas flow 52, conducted through the interstices 66, the recuperator 30 is not limited to such usage.

Referring now to FIG. 7, upon the exhaust gas flow 52 being received at the leading edge 48 of the recuperator plates 44 and reaching the concavities 58, laminar bubbles 68 are formed. When such laminar bubbles 68 form, the gas flow 52 no longer follows the curvature of the recuperator plates 44 and the laminar boundary layer separates from the surface of the recuperator plates 44. Still, due to the residual swirl of the exhaust gas flow 52, the latter illustratively is received at the leading edges 48 of the recuperator plates 44 segment 40 at a positive incidence angle (not shown) such that the laminar bubbles 68 are contained in the concavities 58. As a result, the boundary layer is energized and flow re-attachment occurs behind the laminar bubbles 68 immediately downstream of the concavities 58. The re-attachment of the exhaust gas flow 52 to the plates 44 then ensures flow turning with reduced pressure loss and increased heat transfer at the leading edge 48 of the plates 44. Leading edge aerodynamics on the recuperator segment 40 are further significantly improved, thus improving the overall efficiency of the recuperator 30.

Figure 8:
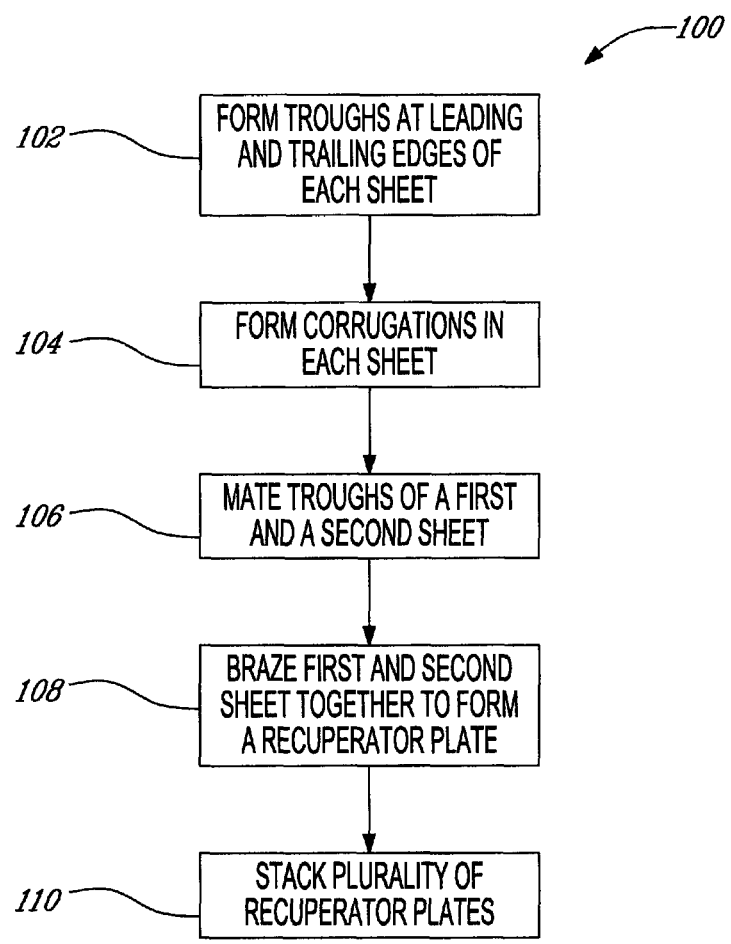
FIG. 8 is a flowchart of a method for manufacturing a recuperator in accordance with an embodiment.

Referring to FIG. 8, a method 100 for manufacturing a recuperator will now be described. The method 100 comprises the step 102 of forming troughs at the leading and trailing edges of each one of a plurality of thermally conductive sheets. The next step 104 may then be to form corrugations in each sheet. The troughs and corrugations may be formed by at least one of press-forming, bending, curling, cutting, deforming, tooling, or otherwise machining the sheets, as discussed above. The next step 106 may then be to mate the troughs of a first sheet to those of a second sheet in order to position the first sheet relative to the second sheet. The first and second sheet may then be joined at step 108 by brazing the leading and trailing edges thereof, thereby forming a recuperator plate. A plurality of the thus formed recuperator plates may then be stacked at step 110 to form each recuperator segment of the recuperator.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A recuperator for a gas turbine engine, the recuperator comprising an air-to-air heat exchanger including a plurality of recuperator plates longitudinally extending in a longitudinal direction between an upstream end and a downstream end spaced apart along a longitudinal axis, the recuperator plates transversely extending in a transverse direction between a leading edge and a trailing edge, the leading edge and the trailing edge each extending longitudinally between the upstream and downstream ends, the transverse direction being substantially perpendicular to the longitudinal direction defined by the longitudinal axis, the plurality of recuperator plates arranged in a spaced-apart relationship to define therebetween a plurality of interstices adapted to direct therethrough at least a first airstream received at the leading plate edge of the recuperator plates and flowing in the transverse direction, each of the recuperator plates defining at least one fluid channel therein, the fluid channel being closed along longitudinally extending edges thereof to direct therethrough at least a second airstream flowing in the longitudinal direction and effecting heat exchange between the first airstream and the second airstream, each said recuperator plate having at least a first concavity disposed at the leading edge thereof, the first concavity extending linearly in the longitudinal direction along the leading edge and substantially parallel to the longitudinal axis of the recuperator plate and to the leading edge, the first concavity thereby extending transverse to the transverse direction of the first airstream flowing over each said recuperator plate, the fluid channel defining a cross-sectional profile having a height in a direction perpendicular to the longitudinal direction and the transverse direction, the height being non-uniform along the transverse direction and narrowing toward the leading edge.

2. The recuperator of claim 1, wherein the first concavity faces a suction side of each said recuperator plate thereby containing a leading edge laminar flow bubble therein and causing re-attachment of laminar flow of the at least one first stream immediately downstream of the first concavity extending along the leading edge.

3. The recuperator of claim 1, wherein each recuperator plate has formed at the trailing edge thereof opposite the leading edge a second concavity, the first and the second concavities extending parallel to the longitudinal axis of the recuperator plate.

4. The recuperator of claim 3, wherein the first and second concavities of a first one of the plurality of recuperator plates are adapted to be transversely aligned with the first and second concavities of a second one of the plurality of recuperator plates for positioning the first recuperator plate relative to the second recuperator plate.

5. The recuperator of claim 3, wherein each recuperator plate comprises a first thermally conductive sheet coupled to a second thermally conductive sheet, the first thermally conductive sheet having a first leading sheet edge and a first trailing sheet edge opposite the first leading sheet edge and the second thermally conductive sheet having a second leading sheet edge and a second trailing sheet edge opposite the second leading sheet edge.

6. The recuperator of claim 5, wherein the first thermally conductive sheet is coupled to the second thermally conductive sheet by brazing the first leading sheet edge to the second leading sheet edge and the first trailing sheet edge to the second trailing sheet edge.

7. The recuperator of claim 6, wherein the first thermally conductive sheet has formed adjacent the first leading sheet edge a first leading recess and the second thermally conductive sheet has formed adjacent the second leading sheet edge a second leading recess, the first leading recess adapted to be mated with the second leading recess for forming the first concavity when the first thermally conductive sheet is coupled to the second thermally conductive sheet.

8. The recuperator of claim 7, wherein the first thermally conductive sheet has formed adjacent the first trailing sheet edge a first trailing recess and the second thermally conductive sheet has formed adjacent the second trailing sheet edge a second trailing recess, the first trailing recess adapted to be mated with the second trailing recess for forming the second concavity when the first thermally conductive sheet is coupled to the second thermally conductive sheet.

9. The recuperator of claim 5, wherein the first thermally conductive sheet of each recuperator plate has formed therein a first plurality of protrusions and the second thermally conductive sheet of the recuperator plate has formed therein a second plurality of protrusions, a convexly curved surface of each one of the second plurality of protrusions adapted to be conformally fitted to a concavely curved surface of each one of the first plurality of protrusions when the first thermally conductive sheet is coupled to the second thermally conductive sheet.

10. The recuperator of claim 9, wherein the fluid channel of the recuperator plate is defined between the convexly curved surface and the concavely curved surface.

11. The recuperator of claim 1, wherein the plurality of plates are arranged in a stacked relationship and comprise a first plurality of plates having formed therein a plurality of protrusions and a second plurality of plates having formed therein a plurality of recesses, a first concavely curved surface of each one of the plurality of protrusions positioned adjacent a second concavely curved surface of each one of the plurality of recesses and defining therebetween each one of the plurality of interstices.

12. A gas turbine engine comprising:
a compressor which pressurizes an air flow;
a combustor receiving the pressurized air flow and which ignites a mixture of fuel and the pressurized air flow to develop an output flow of expanded combustion gasses through one or more turbine sections for generating propulsion;
a turbine receiving the output flow of expanded combustion gasses from the combustor and extracting energy from the combustion gases; and
a recuperator disposed downstream of the turbine and receiving hot exhaust gasses therefrom, the recuperator comprising a plurality of elongated recuperator plates extending in a longitudinal direction between an upstream end and a downstream end spaced apart along a longitudinal axis, the recuperator plates transversely extending in a transverse direction between a leading edge and a trailing edge, the transverse direction being substantially perpendicular to the longitudinal direction, the plurality of recuperator plates arranged in a spaced-apart relationship to define therebetween a plurality of interstices directing therethrough at least one first stream of the hot exhaust gasses flowing in the transverse direction and received at the leading edge of the recuperator plates, each of the recuperator plates enclosing at least one fluid channel therein through which at least one second stream of colder compressor airflow, received from the compressor, flows in the longitudinal direction, the recuperator plates effecting heat exchange between the at least one first stream of hot exhaust gasses and the at least one second stream of colder compressor airflow, each of the recuperator plates having at the leading edge thereof a first concavity extending linearly along the leading edge in the longitudinal direction and substantially parallel to the longitudinal axis of the recuperator plate and to the leading edge, the first concavity thereby extending in the transverse direction of the at least one first stream flowing over each said recuperator plate, a cross-sectional profile of the at least one fluid channel having a height relative to a direction perpendicular to the longitudinal direction and the transverse direction, the height being non-uniform along the transverse direction and narrowing toward the leading edge.

13. The engine of claim 12, wherein the first concavity faces a suction side of each said recuperator plates thereby containing a leading edge laminar flow bubble therein and causing re-attachment of laminar flow of the at least one first stream immediately downstream of the first concavity extending along the leading edge.

14. The engine of claim 12, wherein each recuperator plate has formed at a trailing plate edge thereof opposite the leading edge a second concavity and further wherein the first and second concavities of a first one of the plurality of recuperator plates are adapted to be aligned with the first and second concavities of a second one of the plurality of recuperator plates for positioning the first recuperator plate relative to the second recuperator plate.

15. The engine of claim 12, wherein each recuperator plate comprises a first thermally conductive sheet having formed therein a first plurality of protrusions and a second thermally conductive sheet having formed therein a second plurality of protrusions, the first sheet coupled to the second sheet such that the fluid channel of each recuperator plate is defined between a concavely curved surface of each one of the first plurality of protrusions and a convexly curved surface of each one of the second plurality of protrusions.

16. The engine of claim 12, wherein the plurality of recuperator plates are arranged in a stacked relationship and comprise a first plurality of plates having formed therein a plurality of protrusions and a second plurality of plates having formed therein a plurality of recesses, a first concavely curved surface of each one of the plurality of protrusions positioned adjacent a second concavely curved surface of each one of the plurality of recesses and defining therebetween each one of the plurality of interstices.

* * * * *